(12) United States Patent
Lo

(10) Patent No.: US 9,164,241 B2
(45) Date of Patent: Oct. 20, 2015

(54) LOW LOSS PASSIVE OPTICAL HUB FOR USE IN THE PLASTIC OPTICAL FIBER NETWORKS

(71) Applicant: Honeywell International Inc., Morristown, NJ (US)

(72) Inventor: Charles Lo, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 77 days.

(21) Appl. No.: 13/945,545

(22) Filed: Jul. 18, 2013

(65) Prior Publication Data

US 2015/0023638 A1      Jan. 22, 2015

(51) Int. Cl.
   *G02B 6/287*      (2006.01)
   *G02B 6/28*       (2006.01)
   *B29L 11/00*      (2006.01)

(52) U.S. Cl.
   CPC .............. *G02B 6/287* (2013.01); *G02B 6/2856* (2013.01); *B29L 2011/0075* (2013.01)

(58) Field of Classification Search
   CPC .... G02B 6/125; G02B 6/2804; G02B 6/2808; G02B 6/353; G02B 6/3556; G02B 6/287; G02B 6/2856; H04Q 11/0005; H04Q 2011/0015; H04Q 2011/0026; B29L 2011/0075
   USPC .......................................... 385/14, 17, 24, 46
   See application file for complete search history.

(56) References Cited

U.S. PATENT DOCUMENTS

| | | | |
|---|---|---|---|
| 3,883,222 A | 5/1975 | Gunderson | |
| 4,360,248 A * | 11/1982 | Bickel et al. | 385/46 |
| 5,016,963 A * | 5/1991 | Pan | 385/33 |
| 5,078,468 A * | 1/1992 | Stone | 385/116 |
| 5,282,257 A * | 1/1994 | Ota | 385/46 |
| 5,343,545 A | 8/1994 | Ota et al. | |
| 5,408,556 A * | 4/1995 | Wong | 385/48 |
| 5,438,873 A * | 8/1995 | Wlodarczyk et al. | 73/705 |
| 5,487,122 A * | 1/1996 | Ota | 385/46 |
| 5,953,477 A * | 9/1999 | Wach et al. | 385/115 |
| 6,574,387 B2 | 6/2003 | Wu | |
| 6,792,008 B2 * | 9/2004 | Wolak et al. | 372/6 |
| 6,816,652 B1 * | 11/2004 | Lin et al. | 385/39 |
| 6,823,117 B2 * | 11/2004 | Vakili et al. | 385/43 |
| 6,959,131 B2 * | 10/2005 | Willig | 385/43 |
| 6,990,278 B2 * | 1/2006 | Vakili et al. | 385/46 |
| 7,558,455 B2 * | 7/2009 | Weir et al. | 385/119 |
| 2002/0054740 A1 * | 5/2002 | Vakili et al. | 385/115 |
| 2002/0159488 A1 * | 10/2002 | Wolak et al. | 372/36 |

(Continued)

FOREIGN PATENT DOCUMENTS

WO      9008030      7/1990

OTHER PUBLICATIONS

Ota et al., Eight-port multimode interconnectable star coupler adopting intersected optical waveguide circuits, Electronics Letters, V. 32, No. 4, p. 320, 1996.*

(Continued)

*Primary Examiner* — Peter Radkowski
(74) *Attorney, Agent, or Firm* — Fogg & Powers LLC

(57) ABSTRACT

A node for a low loss passive optical hub is provided. The low loss passive optical hub includes a 1:N-split fiber and a plastic-optical fiber. The 1:N-split fiber has a fused-fractional end and N second-fractional ends. The 1:N-split fiber is formed from N sub-fibers. The N sub-fibers each have a first-fractional end and a second-fractional end. The N first-fractional ends are fused to form the fused-fractional end. The plastic-optical fiber has a first end and a second end. The first end of the plastic-optical fiber is optically coupled to the fused-fractional end of the 1:N-split fiber.

14 Claims, 12 Drawing Sheets

(56) References Cited

U.S. PATENT DOCUMENTS

| | | | | |
|---|---|---|---|---|
| 2002/0191915 | A1* | 12/2002 | Anjan | 385/43 |
| 2005/0185888 | A1* | 8/2005 | Willig | 385/43 |
| 2006/0045444 | A1* | 3/2006 | Miller et al. | 385/115 |
| 2009/0002794 | A1* | 1/2009 | Weir et al. | 359/213 |
| 2010/0027020 | A1* | 2/2010 | Nebosis | 356/450 |
| 2010/0213357 | A1* | 8/2010 | Artyushenko | 250/227.24 |

OTHER PUBLICATIONS

Ota et al., "Eight-Port Multimode Interconnectable Star Coupler Adotping Intersected Optical Waveguide Circuits", "Electronics Letters", Feb. 15, 1996, pp. 320-321, vol. 32, No. 4.

Ota, "Four-Port Multimode Interconnectable Star Coupler", "Electronics Letters", May 13, 1993, pp. 919-920, vol. 29, No. 10.

* cited by examiner

LOW LOSS PASSIVE OPTICAL HUB FOR USE IN THE PLASTIC OPTICAL FIBER NETWORKS

BACKGROUND

Plastic Optical Fiber (POF) is gaining popularity in avionic lower bandwidth (10-50 mbps) networks since plastic-optical fibers are low cost, light weight, and easy to install and to maintain. POF has inherently higher loss than glass fibers so the link budget is an important factor in the acceptance of POF into aircraft. A Passive Optical Hub (POH) would be an ideal component to enable plastic-optical fiber in a conventional bus network. However, unlike the copper data bus, the currently available passive optical hubs suffer loss that limits the network size (e.g., the number of nodes) and the distance covered by the hub. Current bus network passive optical hub designs incorporate either a mirror or a return loop. Both the mirror and return loop suffer from return loss, reflectivity losses, dispersion, and uniformity losses.

For the reasons stated above and for other reasons stated below which will become apparent to those skilled in the art upon reading and understanding the specification, there is a need in the art for improved passive optical hubs.

SUMMARY

The embodiments of the present invention provide a passive optical hub made from plastic fibers (a plastic POH) and methods for making the plastic passive optical hub and will be understood by reading and studying the following specification.

The present application relates to a node for a low loss passive optical hub. The low loss passive optical hub includes a 1:N-split fiber and a plastic-optical fiber. The 1:N-split fiber has a fused-fractional end and N second-fractional ends. The 1:N-split fiber is formed from N sub-fibers. The N sub-fibers each have a first-fractional end and a second-fractional end. The N first-fractional ends are fused to form the fused-fractional end. The plastic-optical fiber has a first end and a second end. The first end of the plastic-optical fiber is optically coupled to the fused-fractional end of the 1:N-split fiber.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and optical changes may be made without departing from the scope of the present invention. The following detailed description is, therefore, not to be taken in a limiting sense.

Instead of bundling all ports and fusing them together to combine all ports into one and reflect the light wave back onto these ports, as is done in prior art passive optical hubs (POHs), the embodiments of POHs described herein physically split a plastic-optical fiber and connect the split sections into a peer to peer bus network. The POHs described herein are formed from plastic optical fibers.

Figure 1:
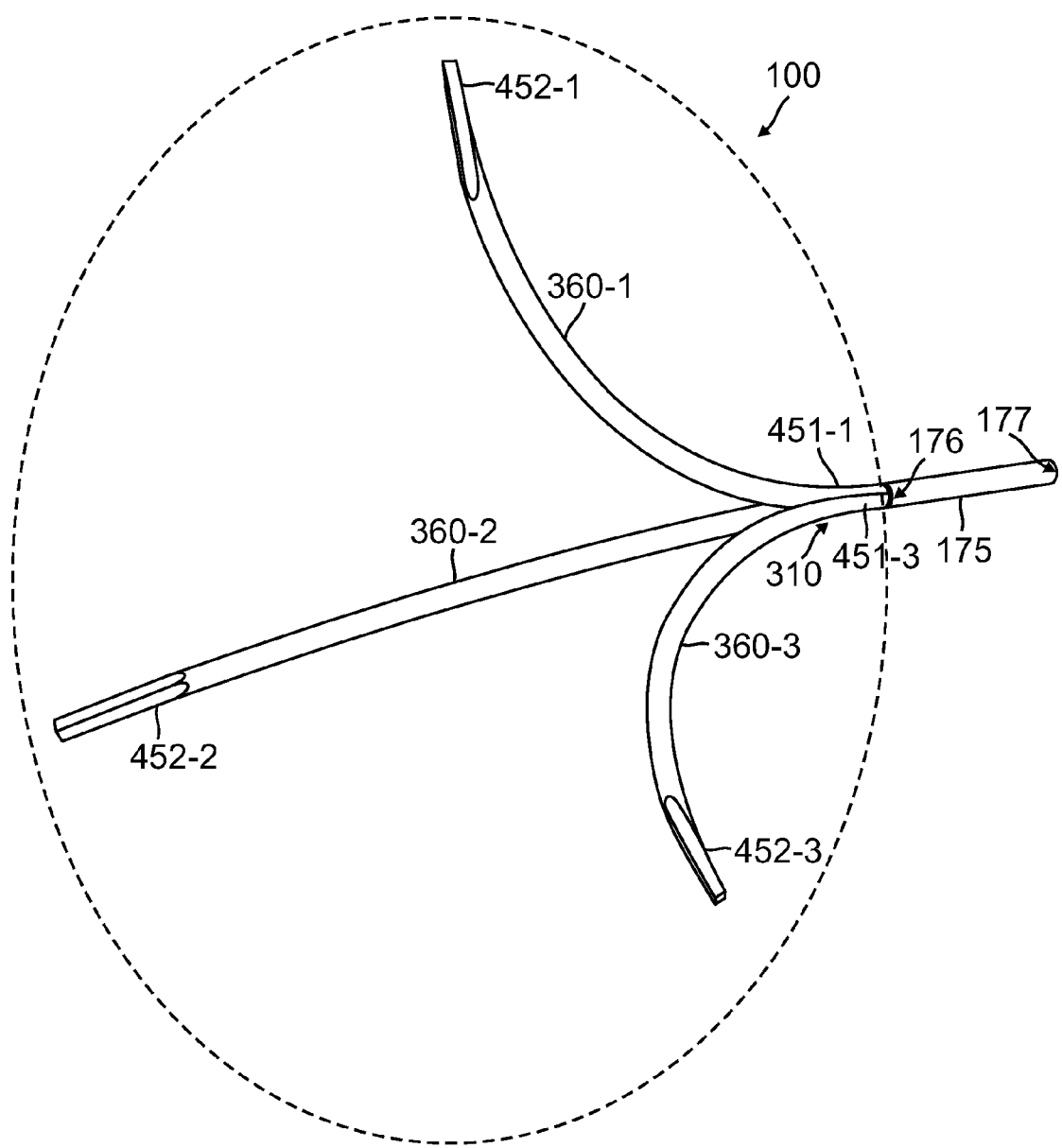
FIG. 1 illustrates an embodiment of node for a low loss passive optical hub in accordance with the present invention.

FIG. 1 illustrates an embodiment of node 100 for a low loss passive optical hub in accordance with the present invention. The node 100 includes a 1:N-split fiber 350 and a plastic-optical fiber 175. The plastic-optical fiber 175 has a first end 176 and a second end 177.

The 1:N-split fiber 350 is formed from N sub-fibers 360(1-N). The N sub-fibers 360(1-N) each have a first-fractional end 451 and a second-fractional end 452. The N first-fractional ends 451 are fused to form a fused-fractional end 310. In one implementation of this embodiment, N equals 2. In another implementation of this embodiment, N is greater than 3.

As shown in FIG. 1, N equals 3 and the 1:N-split fiber is a 1:3-split fiber 350. The node 100 is an optical node 100 to split optical power propagating from the optical fiber 175 to the 1:3-split fiber 350 into 3 approximately equal amounts. The 1:3-split fiber is formed from three sub-fibers represented generally at 360(1-3) in FIG. 1. The first sub-fiber 360-1 has a first-fractional end 451-1 and a second-fractional end 452-1. The third-sub-fiber 360-3 has a first-fractional end 451-1 and a second-fractional end 452-1. The second-sub-fiber 360-2 has a first-fractional end 451-2, which is obscured behind the first-fractional ends 451-1 and 451-2 in FIG. 1, and a second-fractional end 452-2. The three (3) first-fractional ends 451 (1-3) are fused to form a fused-fractional end 310. The 1:3-split fiber 350 has the fused-fractional end 310 and the loose first-fractional ends 452(1-3). The first end 176 of the plastic-optical fiber 175 is optically coupled to the fused-fractional end 310 of the 1:N-split fiber 350, either directly or through a beam expander, which is described in detail below.

If the first-fractional ends 451(1-3) have equal cross-sectional areas then the first-fractional ends 451(1-3) of the sub-fibers 360(1-3) each subtend a 120 degree angle. If the first-fractional ends 451(1-3) do not have equal cross-sectional areas then the first-fractional ends 451(1-3) of the sub-fibers 360(1-3) can have a cross-sectional proportions that sum to 100%. For example, the first-fractional ends 451-1, 451-2, and 451-3 have exemplary relative percentages of cross-sections of: 60%/20%/20%; 40%/30%/30%; or 50%/30%/20%. If the first-fractional ends 451-1, 451-2, and 451-3 can have exemplary relative percentages of cross-sections of: 50%/30%/20%, then the first first-fractional end 451-1 subtends an angle of 180 degrees, the second first-fractional end 451-2 subtends an angle of 108 degrees, and the third first-fractional end 451-3 subtends an angle of 72. The subtended angles sum to 360 degrees.

The relative percentages of cross-sections of the first-fractional ends 451(1-3) are selected based on the design of a POH, the location of the node 100 in the POH, and the location of the POH in a network of POH the POH described herein.

Figure 2B:
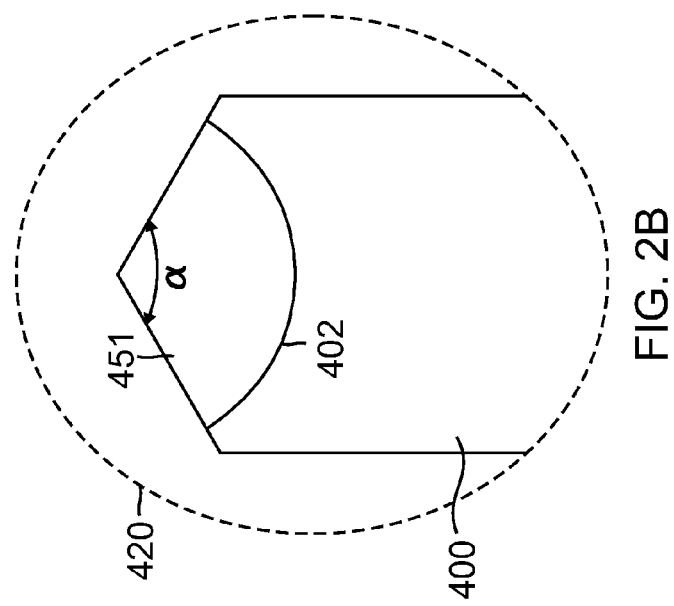
FIG. 2B illustrates a cross-section view of the first-fractional end of the sub-fiber in the fiber-shaving apparatus of FIG. 2A in accordance with the present invention.
Figure 2A:
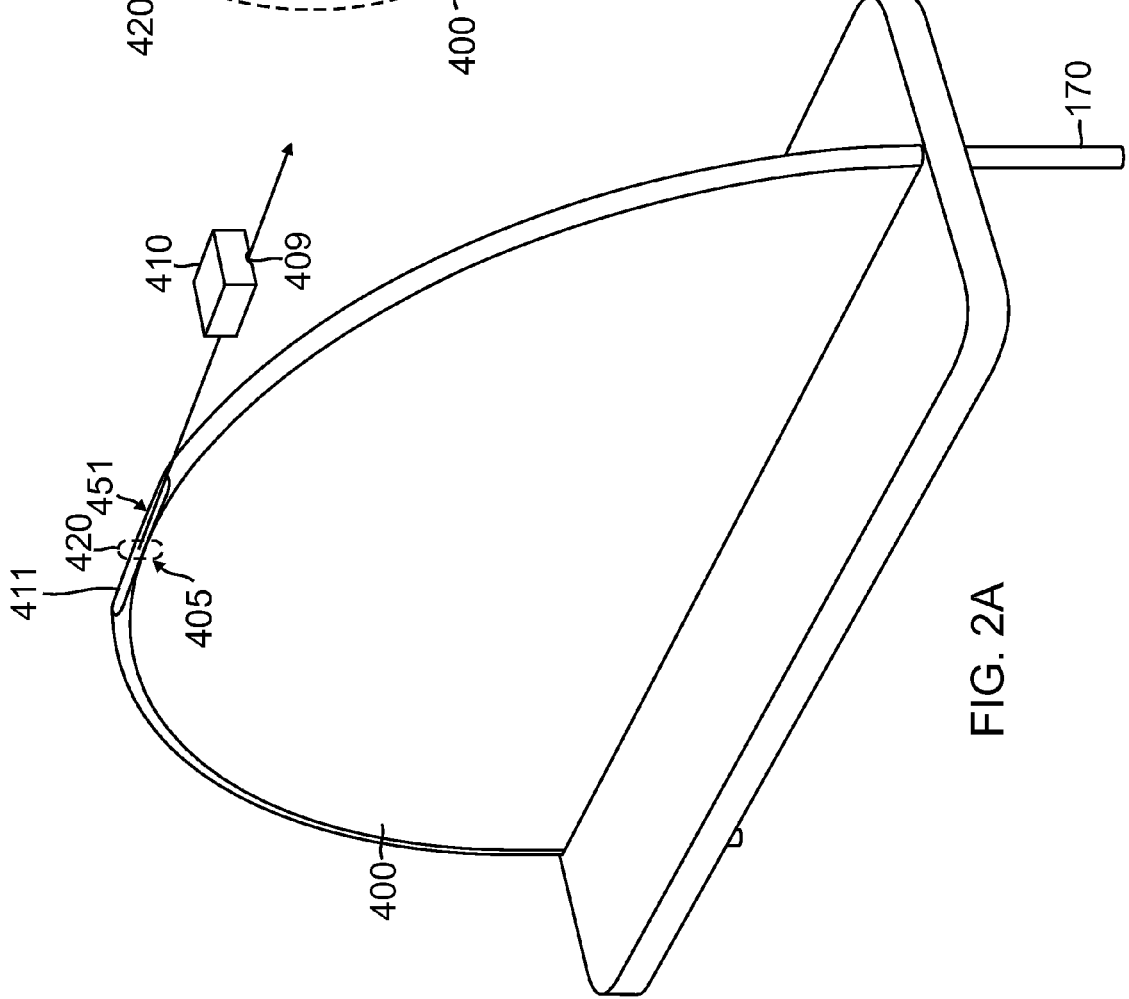
FIG. 2A illustrates a fiber-shaving apparatus with a fiber shaved to form a first-fractional end of a sub-fiber in accordance with the present invention.
Figure 2C:
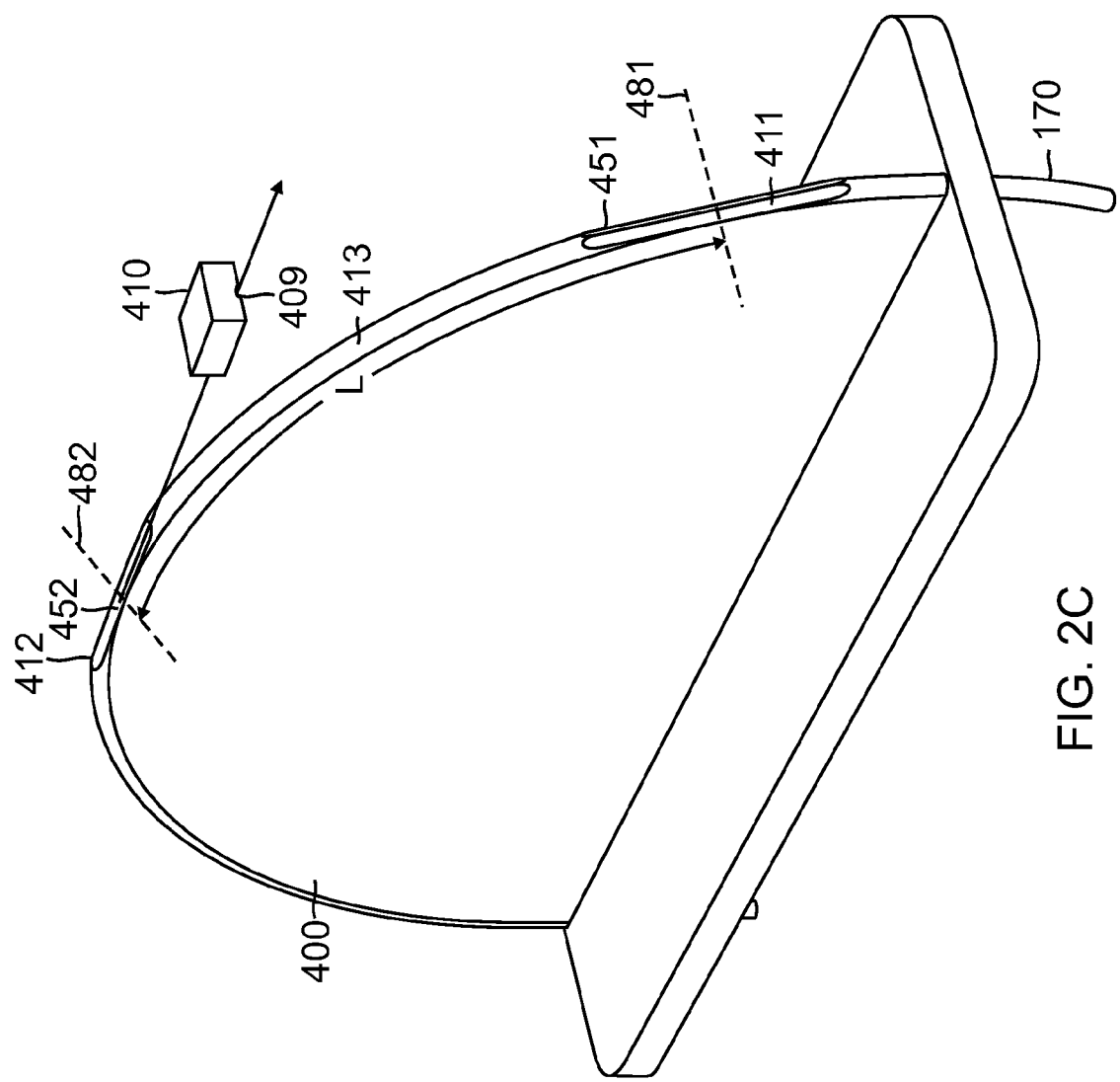
FIG. 2C illustrates the fiber-shaving apparatus of FIG. 2A with a fiber shaved to form a first-fractional end and a second-fractional end of a sub-fiber in accordance with the present invention.
Figure 3:
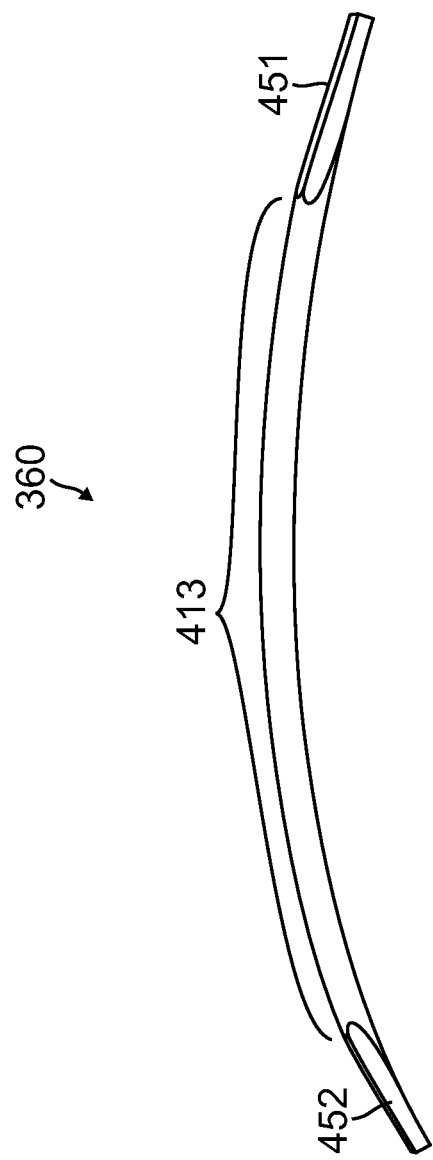
FIG. 3 illustrates a sub-fiber in accordance with the present invention.

In one implementation of this embodiment, the three sub-fibers 360(1-3) are fabricated by mechanically shaving a plastic-optical fiber 176 into three sub-fibers 360(1-3) having the desired proportion of cross-sectional areas. FIG. 2A illustrates a fiber-shaving apparatus 400 with a fiber 170 shaved to form a first-fractional end 451 of a sub-fiber 360 (FIG. 1) in accordance with the present invention. FIG. 2B illustrates a cross-section view of the first-fractional end 451 of the sub-fiber 170 formed by n the fiber-shaving apparatus 400 of FIG. 2A in accordance with the present invention. The circle 420 in FIG. 2A is shown expanded in cross-section in FIG. 2B. FIG. 2C illustrates the fiber-shaving apparatus 400 of FIG. 2A with a fiber 170 shaved to form a first-fractional end 451 and a second-fractional end 452 of a sub-fiber 360 in accordance with the present invention. FIG. 3 illustrates a sub-fiber 360 in accordance with the present invention. The sub-fiber 360 was formed by the shaving process indicated by FIGS. 2A-2C.

As shown in FIG. 2A, a plastic-optical fiber 170 is positioned in groove 402 (FIG. 2B) in the fiber-shaving apparatus 400. A shaving element 410 has a V-shaped-indent 409. The angle of the V in the V-shaped-indent 409 is the angle of desired subtended angle in the first-fractional end 451 and the second-fractional end 452. As shown in FIG. 2B, the first-fractional end 451 subtends the angle α. To form the first-fractional end 451 shown in FIG. 2B, the angle of the V in the V-shaped-indent 409 is the angle α.

The shaving element 410 is run over the plastic-optical fiber 170 along a first portion 411 that is at the top of the curve of the fiber-shaving apparatus 400 represented generally at 405. A first portion 411 of the plastic-optical fiber 170 is thus shaved and has a cross sectional shape subtending the angle α as shown in FIG. 1B. In one implementation of this embodiment, the plastic-optical fiber 170 is held still and the shaving element 410 is moved along the plastic-optical fiber 170 to shave a first portion 411 of the plastic-optical fiber 170. In another implementation of this embodiment, the shaving element 410 is placed against the plastic-optical fiber 170 at the top 405 of the curve of the fiber-shaving apparatus 400 and the plastic-optical fiber 170 is pulled so the plastic-optical fiber 170 moves under the fiber-shaving apparatus 400 for a length equal to the length of the first portion 411.

After the first-fractional end 451 is shaved the plastic-optical fiber 170 is pulled along the fiber-shaving apparatus 400 (without the shaving element 410 touching the plastic-optical fiber 170) until a section 412 of the plastic-optical fiber 170 located a length L from the center of the first portion 411 (e.g., from the dashed line 481 shown in FIG. 2C) is at the top 405 of the curve of the fiber-shaving apparatus 400. The shaving element 410 is again run over the plastic-optical fiber 170 along the second portion 412 that is now at the top 405 of the curve of the fiber-shaving apparatus 400.

The plastic-optical fiber 170 is removed from the fiber-shaving apparatus 400 and the plastic-optical fiber 107 is cut at the midsection represented generally at 481 of the first portion 411 and is cut at the midsection represented generally at 482 of the second portion 412 to form the sub-fiber 360. The resultant sub-fiber 360 is shown in FIG. 3. Between the first-fractional end 451 and a second-fractional end 452 of the sub-fiber 360 is a non-fractional segment 413 of the sub-fiber 360.

When the 1:3-split fiber 350 is used as a node 100 (FIG. 1) in a passive optical hub, four (4) nodes 100 are required to form the passive optical hub. When a 1:4-split fiber is used as a node in a passive optical hub, five nodes are required to form the passive optical hub. In this latter case, N equals four (4), and a plastic-optical fiber 170 is shaved into 4 equal sub-fibers that are a one/quarter segments of the plastic-optical fiber and look like wedges that subtend an angle of approximately 90 degrees. Alternately, the four sub-fibers forming a 1:4-split fiber can include the first-fractional ends 451-1, 451-2, 451-3, and 451-4 with unequal relative percentages of cross-sections.

In one implementation of this embodiment, the plastic-optical fiber 170, from which the sub-fiber 360 is formed, has a diameter of 1 mm. In another implementation of this embodiment, the plastic-optical fiber 170 has a diameter of 2 mm. In this latter embodiment, a beam expander is inserted between the sub-fibers forming a 1:N-split fiber and the plastic-optical fiber of a POH as described in detail below.

Figure 4:
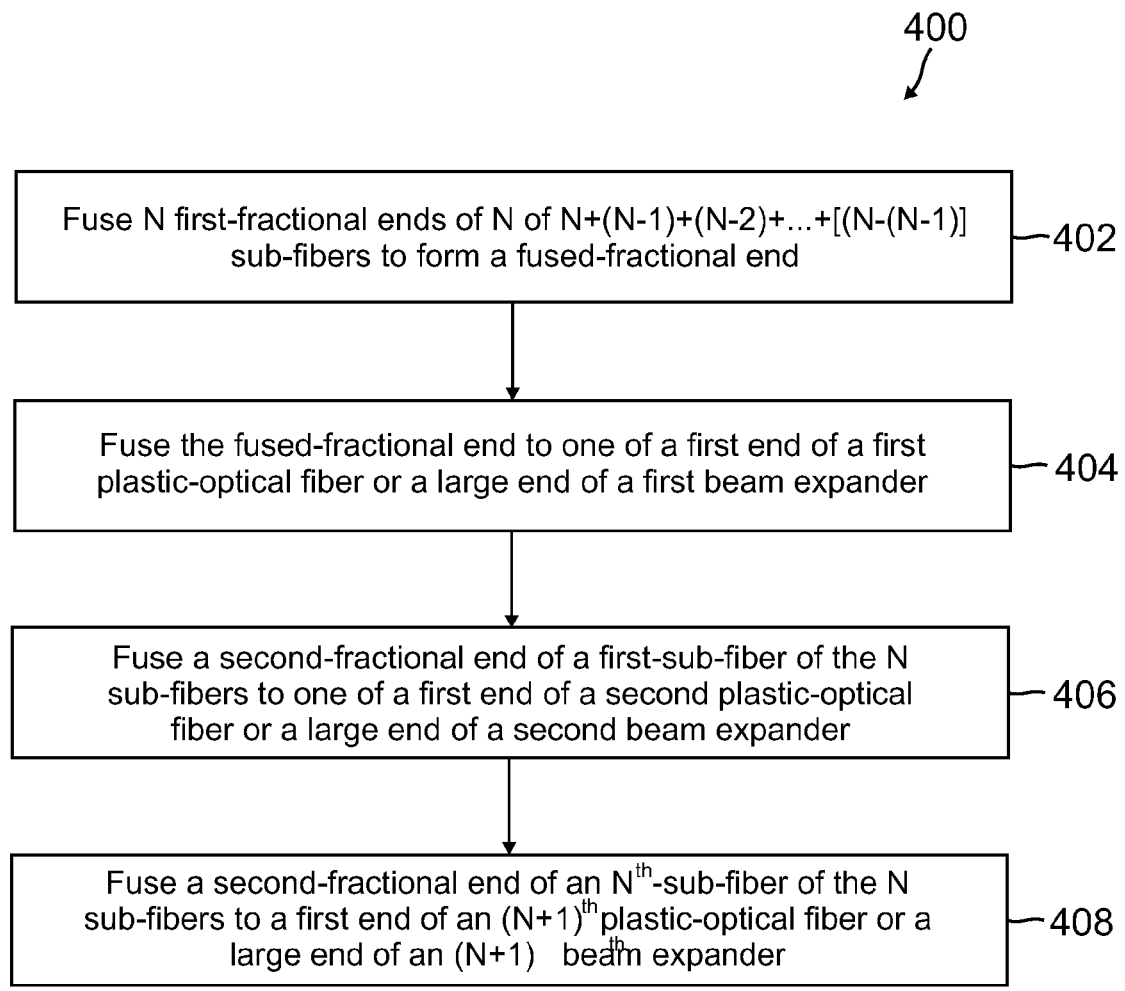
FIG. 4 is a flow diagram of an embodiment of a method of forming an (N+1)-way passive optical hub for use in a plastic optical fiber network.
Figure 5:
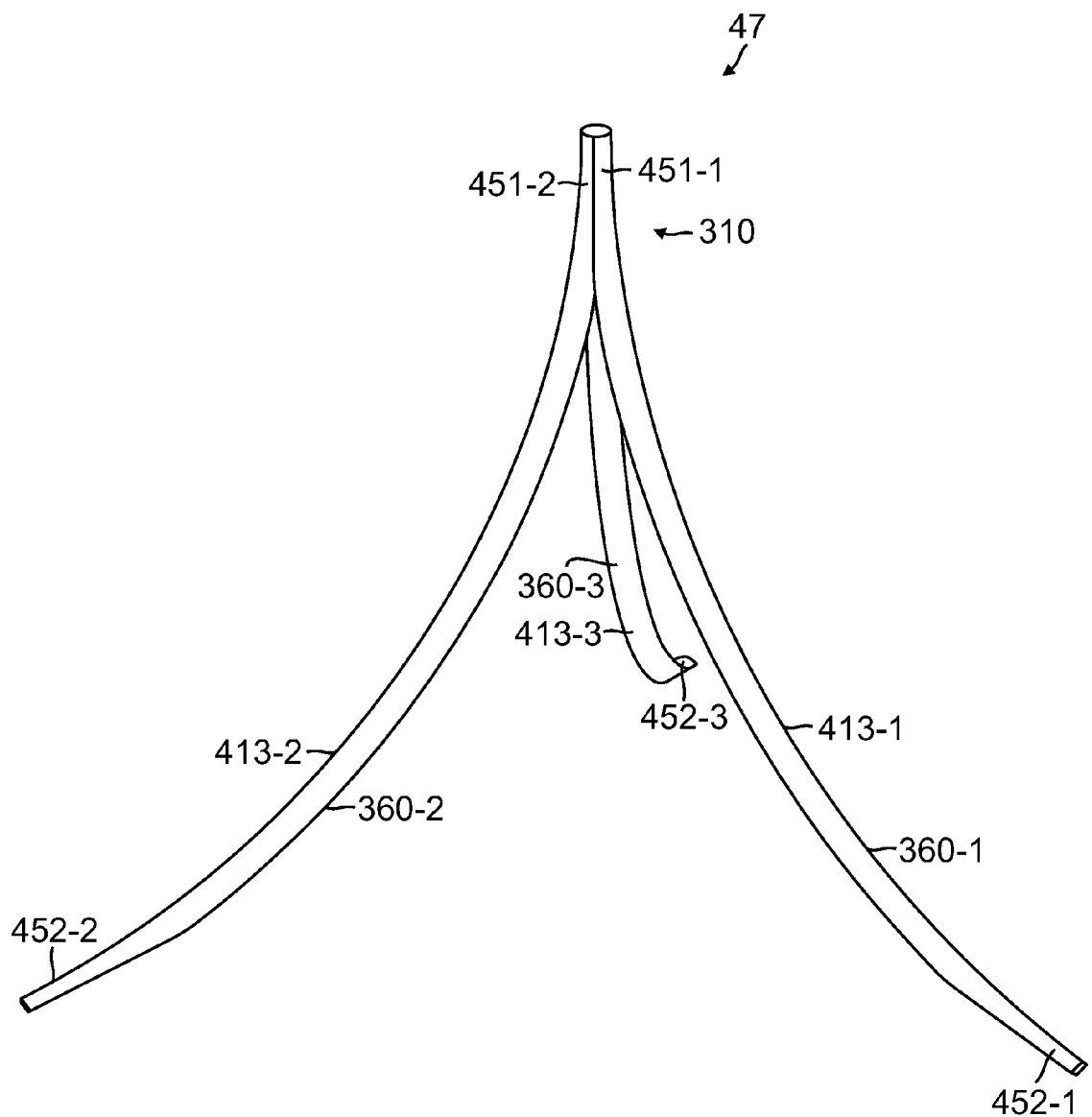
FIG. 5 illustrates three first-fractional ends of three respective sub-fibers fused to form a fused-fractional end in accordance with the present invention.
Figure 6:
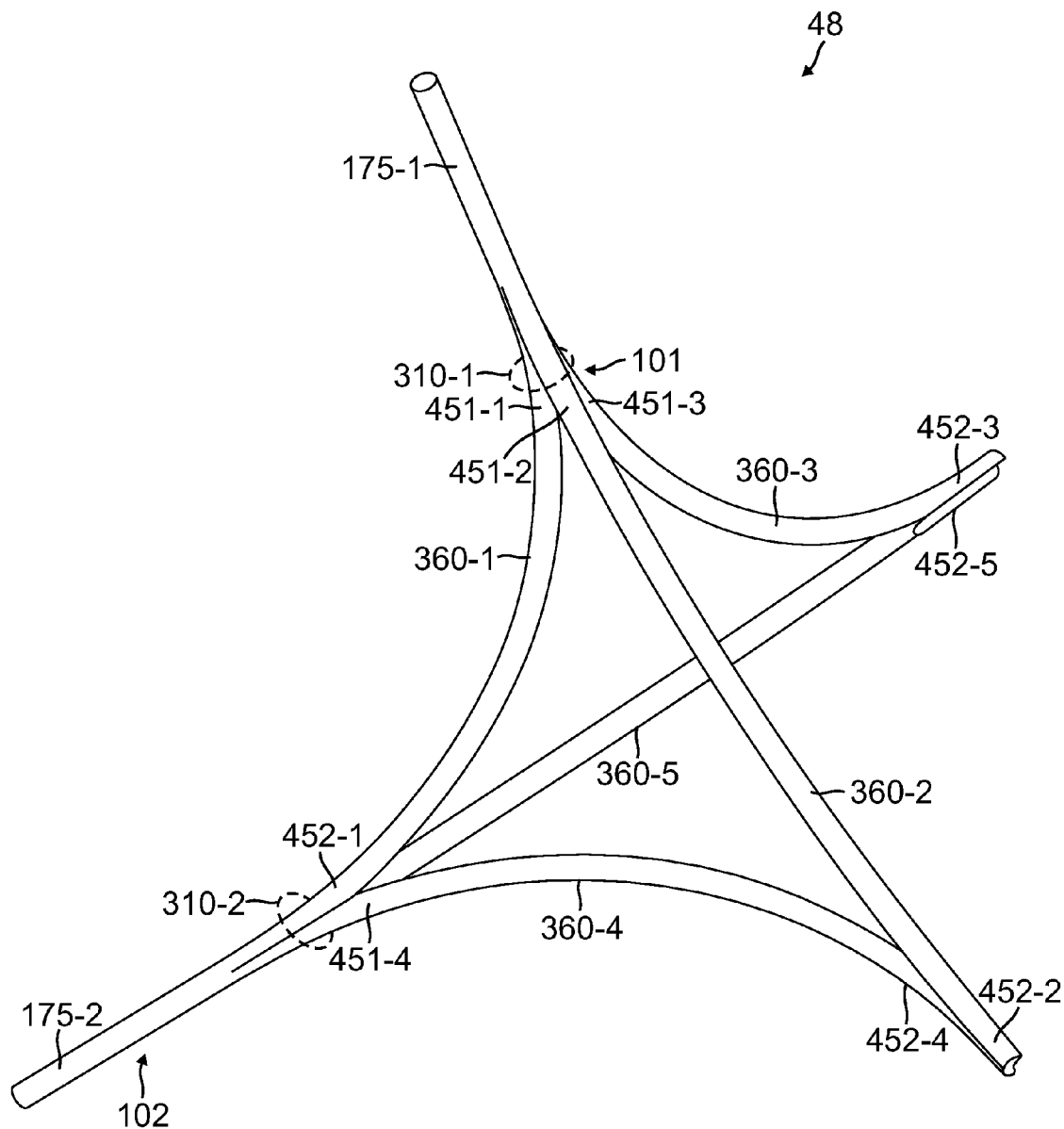
FIG. 6 illustrates a partially formed plastic optical hub in which two fused-fractional ends are fused to two respective plastic-optical fibers in accordance with the present invention.
Figure 7:
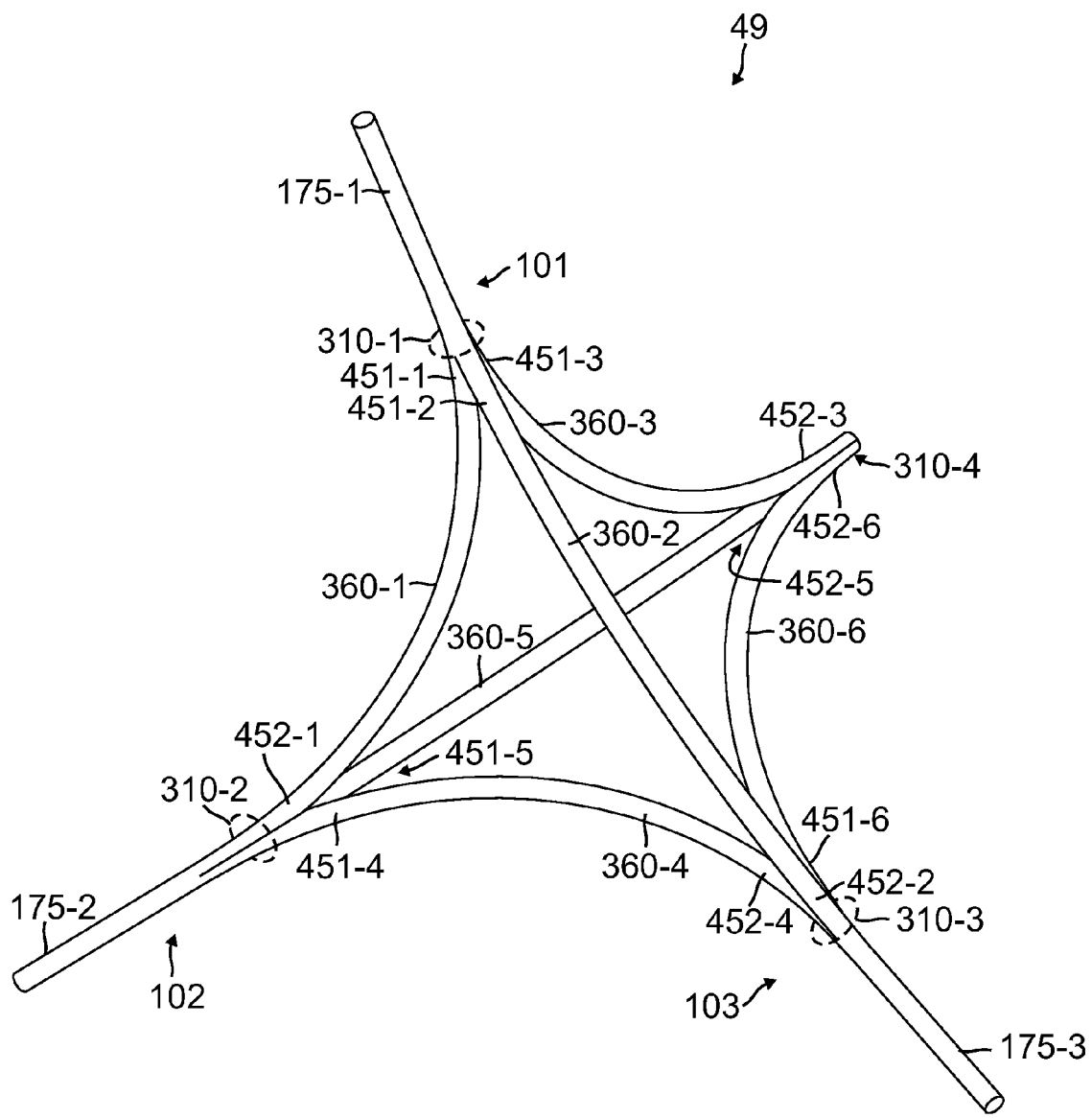
FIG. 7 illustrates a partially formed plastic optical hub in which three fused-fractional ends are fused to three respective plastic-optical fibers in accordance with the present invention.
Figure 8:
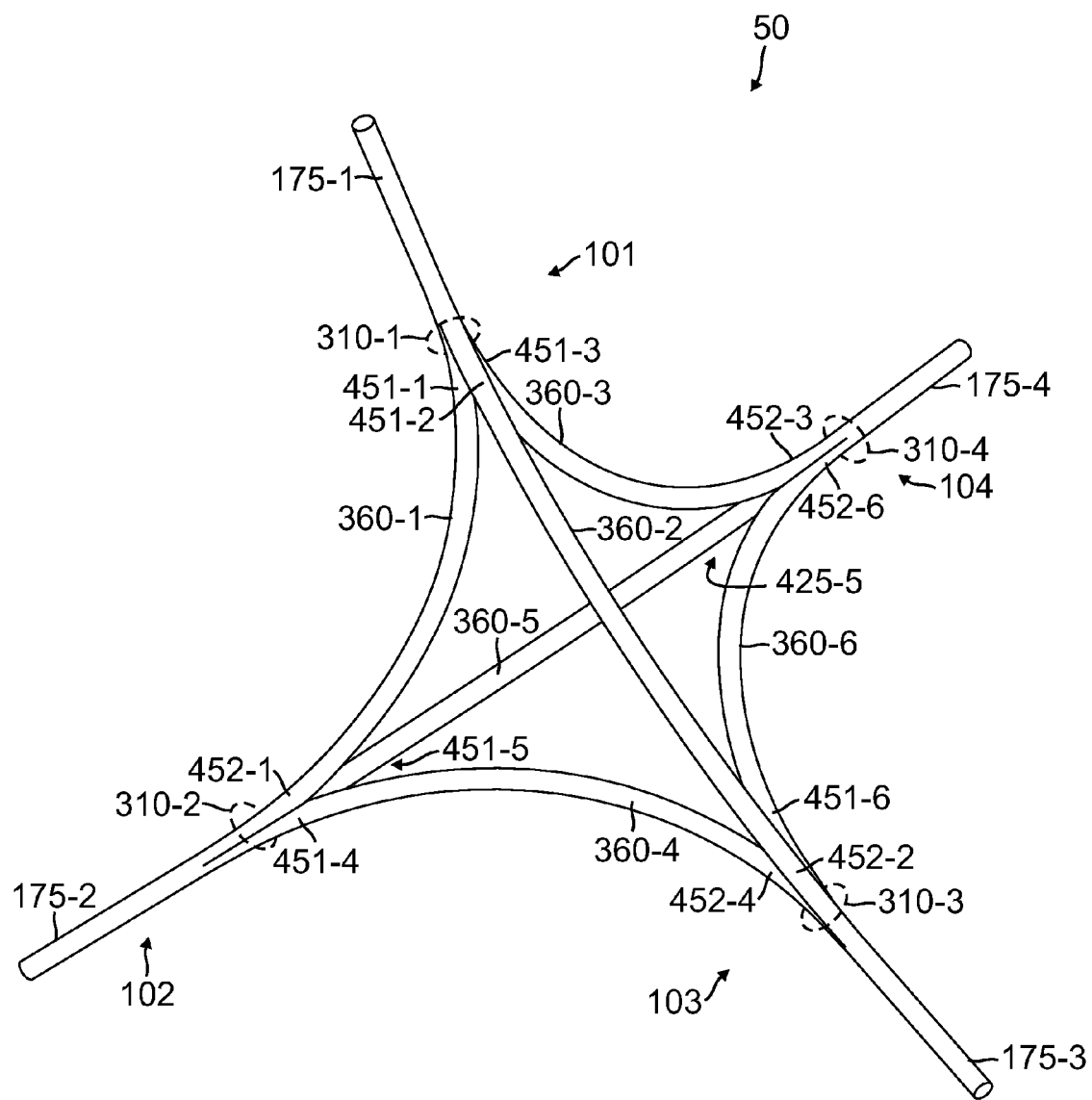
FIG. 8 illustrates the plastic optical hub in accordance with the present invention.

FIG. 4 is a flow diagram of an embodiment of a method 400 of forming an (N+1)-way passive optical hub (POH) for use in a plastic optical fiber network. The fabrication of a 4-way POH from four nodes (FIG. 1) is now described with reference to method 400 of FIG. 4 and FIGS. 5-8. FIG. 5 illustrates three first-fractional ends 451(1-3) of three respective sub-fibers 360(1-3) fused to form a fused-fractional end 310 in accordance with the present invention. The three sub-fibers 360(1-3) with three fused first-fractional ends 451(1-3) form a 1:3 split fiber 47. FIG. 6 illustrates a partially formed plastic optical hub 48 in which two fused-fractional ends 310-1 and 310-2 of two respective 1:3 split fibers (such as, 1:3 split fiber 47 shown in FIG. 5) are fused to two respective first ends 176 of plastic-optical fibers 175-1 and 175-2 in accordance with the present invention. In the partially formed plastic optical hub 48, the two fused-fractional ends 310-1 and 310-2 of two respective 1:3 split fibers (such as, 1:3 split fiber 47 shown in FIG. 5) are fused to two respective plastic-optical fibers 175-1 and 175-2. FIG. 7 illustrates a partially formed plastic optical hub 49 in which three fused-fractional ends 310-1, 310-2, and 310-3 are fused to three respective first ends 176 of plastic-optical fibers 175-1, 175-2, and 175-3 in accordance with the present invention. In the partially formed plastic optical hub 49, the three fused-fractional ends 310-1, 310-2, and 310-3 of three respective 1:3 split fibers (such as, 1:3 split fiber 47 shown in FIG. 5) are fused to three respective first ends 176 of plastic-optical fibers 175-1, 175-2, and 175-3. FIG. 8 illustrates the plastic optical hub 50 in accordance with the present invention. In the plastic optical hub 50, the four fused-fractional ends 310(1-4) of four respective 1:3 split fibers (such as, 1:3 split fiber 47 shown in FIG. 5) are fused to four respective plastic-optical fibers 175(1-4).

At block 402, N first-fractional ends of N of N+(N−1)+(N−2)+ . . . +[N−(N−1)] sub-fibers to form a fused-fractional end. For N=3, as FIG. 5 illustrates, three first-fractional ends 451(1-3) of three respective sub-fibers 360(1-3) are fused to form a fused-fractional end 310 in accordance with the present invention. The fusing of the first-fractional ends 451(1-3) is done by ultrasonically welding, transparent lasic plastic welding, or plastic solvent welding the three first-fractional ends 451(1-3) as they are held together in an appropriately designed chuck. One skilled in the art of ultrasonically welding, transparent lasic plastic welding, or plastic solvent welding will understand how to design the appropriate chuck for the fusing. Ultrasonic welding is a reliable, simple, and low cost approach to fusing the fractional-ends of the sub-fibers to each other. However, anyone of several techniques to bond the sub-fibers to other sub-fibers, including but not limited to transparent lasic plastic welding, or plastic solvent welding can be used. Any future developed technique to bond (fuse) plastic can be used to form the 1:N-split fibers 350, the node 100, and the passive optical hubs described herein.

At block 404, the fused-fractional end 310 is fused to one of a first end of a first plastic-optical fiber or a large end of a first beam expander. When the fused-fractional end 310 is fused to the first end 176 of the plastic-optical fiber 175-1 (FIG. 6) (or a large end of a first beam expander as described below in detail), the node 101 (FIG. 6) (or node 106 shown below with reference to FIG. 10) is formed. In this manner, three first-fractional ends of three of the six sub-fibers are fused to form the fused-fractional end 310-1 of a 1:3 split fiber 47 (FIG. 5) that is fused to the first end 176 of the first plastic-optical fiber 175-1 to form the node 101 (FIG. 6).

In one implementation of this embodiment, the fusing of the first-fractional ends 451(1-3) to each other (block 402) and to the first end 176 of the plastic-optical fiber 175 (block 404) is done simultaneously by ultrasonically welding, transparent lasic plastic welding, or plastic solvent welding the three first-fractional ends 451(1-3) and first end 176 of the plastic-optical fiber 175 as they are held together in an appropriately designed chuck. In one implementation of this embodiment, the plastic-optical fiber 175 has a diameter of 1 mm.

At block 406, a second-fractional end of a first-sub-fiber of the N sub-fibers is to one of a first end of a second plastic-optical fiber or a large end of a second beam expander. As shown in FIG. 6, the second-fractional end 452-1 of the first-sub-fiber 360-1 of the N sub-fibers 360(1-3) is fused to the first end 176 (FIG. 1) of a second plastic-optical fiber 175-2.

As is also shown in FIG. 6, a first-fractional end 451-4 of a fourth-sub-fiber 360-4 of the six sub-fibers 360(1-6) is fused to the first end 176 (FIG. 1) of the second plastic-optical fiber 175-2. As is also shown in FIG. 6, a first-fractional end 451-5 (not visible in FIG. 6 since it is behind the second-fractional end 452-1 and first-fractional end 451-4) of a fifth-sub-fiber 360-5 of the six sub-fibers 360(1-6) is fused to the first end 176 (FIG. 1) of the second plastic-optical fiber 175-2. Thus, three fractional fiber ends are fused to the second plastic-optical fiber 175 to form a second node 102. In one implementation of this embodiment, the second-fractional end 452-1 of the first-sub-fiber 360-1, the first-fractional end 451-4 of the fourth-sub-fiber 360-4, and the first-fractional end 451-5 of the fifth-sub-fiber 360-5 are simultaneously fused to the first end 176 of the second plastic-optical fiber 175-2 to form the second node 102.

At block 408, a second-fractional end of an $N^{th}$-sub-fiber of the N sub-fibers is fused to a first end of an $(N+1)^{th}$ plastic-optical fiber or a large end of an $(N+1)^{th}$ beam expander. As shown in FIG. 7, the second-fractional end 452-2 of the second-sub-fiber 360-2 is fused to a first end 176 (FIG. 1) of a third plastic-optical fiber 175-3.

As is also shown in FIG. 7, a second-fractional end 452-4 of the fourth-sub-fiber 360-4 of the six sub-fibers 360(1-6) is fused to the first end 176 (FIG. 1) of the third plastic-optical fiber 175-3, and the first-fractional end 451-6 of a sixth-sub-fiber 360-6 of the six sub-fibers 360(1-6) is fused to the first end 176 of the third plastic-optical fiber 175-3. Thus, three fractional fiber ends (452-2, 452-4, and 451-6) are fused to the third plastic-optical fiber 175-3 to form a third node 103. In one implementation of this embodiment, the second-fractional end 452-4 of the fourth-sub-fiber 360-4, the first-fractional end 451-6 of the sixth-sub-fiber 360-6, and the second-fractional end 452-2 of the second-sub-fiber 360-2 are simultaneously fused to the first end 176 of the third plastic-optical fiber 175-3 to form the third node 103.

As shown in FIG. 7, the second-fractional end 452-3 of the third-sub-fiber 360-3, the second-fractional end 452-5 of the fifth-sub-fiber 360-5, and the second-fractional end 452-6 of the sixth-sub-fiber 360-6 are bundled together. These fractional ends 452-3, 452-5, and 452-6 are fused to form a fused-fractional end 310-4.

As shown in FIG. 8, the second-fractional end 452-3 of the third-sub-fiber 360-3, the second-fractional end 452-5 of the fifth-sub-fiber 360-5, and the second-fractional end 452-6 of the sixth-sub-fiber 360-6 are fused to the first end 176 (FIG. 1) of the fourth plastic-optical fiber 175 to form the fourth node 104. In this manner, the four optical nodes 101, 102, 103, and 104 are fused to form a low loss passive optical hub 50. The fusing of multiple joints can be made simultaneously by an appropriately configured welding chuck.

In one implementation of this embodiment, the second-fractional end 452-1, the first-fractional end 451-4, and the first-fractional end 451-5 are simultaneously fused to the first end 176 of the second plastic-optical fiber 175-2. In another implementation of this embodiment, the second-fractional end 452-1, the first-fractional end 451-4, and the first-fractional end 451-5 are simultaneously fused to each other and then the second fused-fractional end 310-2 is fused to the first end 176 of the second plastic-optical fiber 175-2.

In yet another implementation of this embodiment, the second-fractional end 452-4, the second-fractional end 452-2, and the first-fractional end 451-6 are simultaneously fused to the first end 176 of the third plastic-optical fiber 175-3. In another implementation of this embodiment, the second-fractional end 452-4, the second-fractional end 452-2, and the first-fractional end 451-6 are simultaneously fused to each other and then the third fused-fractional end 310-3 is fused to the first end 176 of the third plastic-optical fiber 175-3.

In yet another implementation of this embodiment, the second-fractional end 452-3, the second-fractional end 452-5, and the second-fractional end 452-6 are simultaneously fused to the first end 176 of the fourth plastic-optical fiber 175-4. In another implementation of this embodiment, the second-fractional end 452-3, the second-fractional end 452-5, and the second-fractional end 452-6 are simultaneously fused to each other and then the fourth fused-fractional end 310-4 is fused to the first end 176 of the fourth plastic-optical fiber 175-4.

One skilled in the art understands how to form a 5-way POH with five plastic-optical fibers, and ten sub-fibers based on the above description of how to form a 4-way POH with four plastic-optical fibers 175(1-4) and six sub-fibers 360(1-6).

The fused peer-to-peer configuration of a POH described above maintains the highest geometry efficiency possible. There are no mirrors or air gaps as in the current reflectors. Thus, the low cost passive optical hub described herein eliminates return loss, and reflectivity loss and eliminates a long return loop thereby reducing device dispersion loss.

Figure 9:
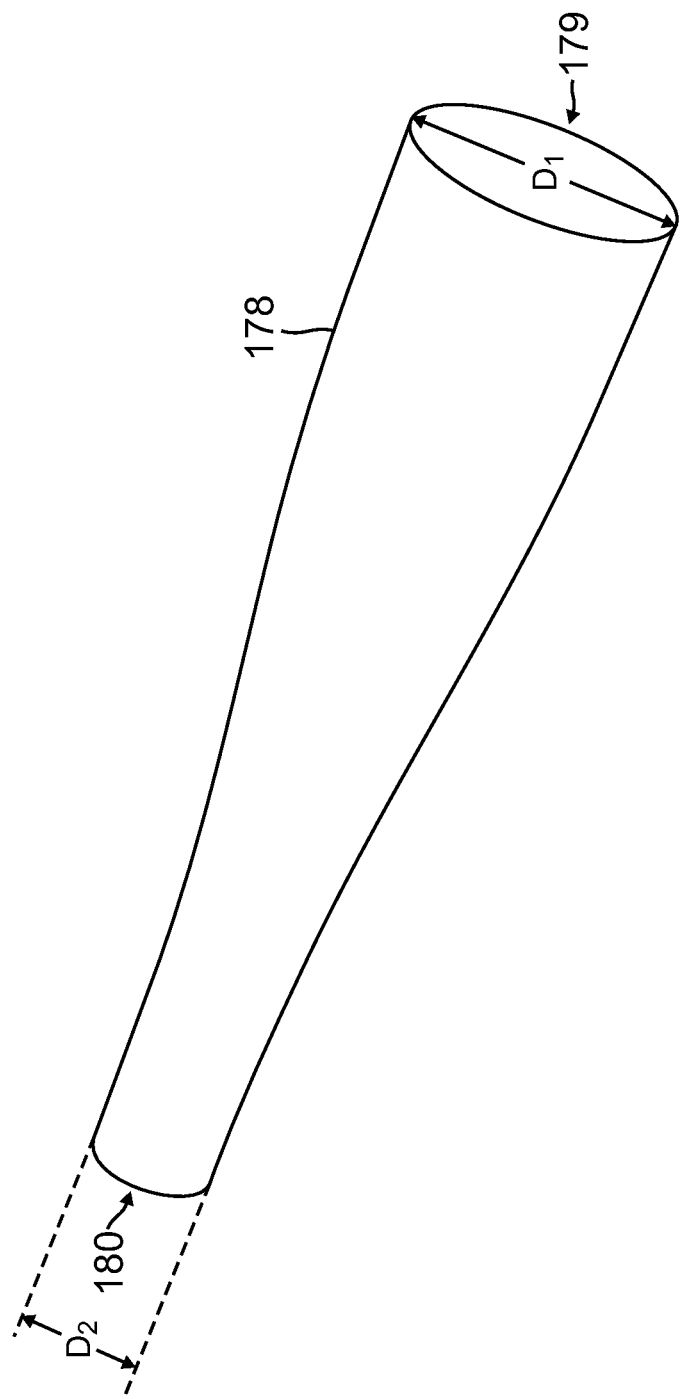
FIG. 9 illustrates a beam expander in accordance with the present invention.
Figure 10:
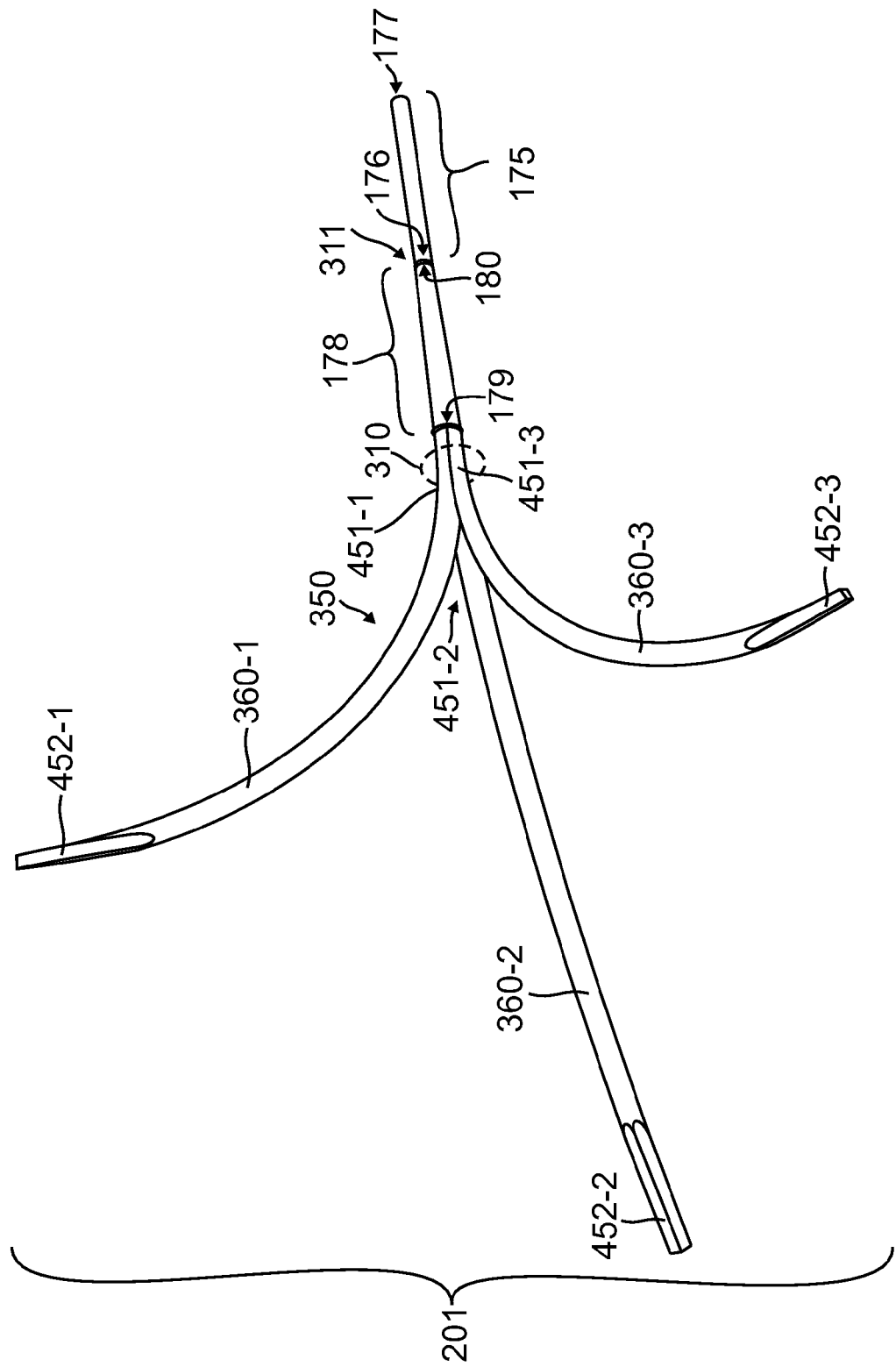
FIG. 10 illustrates an embodiment of a node for a low loss passive optical hub including the beam expander of FIG. 9 in accordance with the present invention.

FIG. 9 shows an exemplary beam expander 178 in accordance with the present invention. FIG. 10 illustrates an embodiment of a node 201 for a low loss passive optical hub including the beam expander 178 of FIG. 9 in accordance with the present invention. As shown in FIG. 9, the beam expander 178 has a large end 179 with a first diameter $D_1$ and a small end 178 with a second diameter $D_2$, where the second diameter $D_2$ is less than the first diameter $D_1$. The beam expander 178 is used to optically couple plastic optical fibers having different diameters.

To improve splitting precision and uniformity, a plastic-optical fiber with a relatively large diameter (e.g., greater than 1 mm) is used to form the 1:N-split fiber. A plastic-optical fiber 175, which typically has a diameter of about 1 mm, can be optically coupled to 1:N-split fiber formed from a larger diameter plastic-optical fiber 170 (FIGS. 2A and 2C) by interfacing the beam expander 178 between the fused-fractional end 310 of the 1:N-split fiber formed from the larger diameter optical fiber 170 and the smaller diameter plastic-optical fiber 175. The beam expander 178 can be formed by injection molding, which is a reliable, inexpensive process.

As used herein, the beam expander 178 optically couples a first end 176 of the plastic optical fiber 175 (FIG. 1) with the second diameter $D_2$ (smaller diameter) to form an embodiment of a 1:N-split fiber (e.g., 1:3-split fiber 350 shown in FIG. 1) with the first diameter $D_1$ (larger diameter). In one implementation of this embodiment, the first diameter is 2 mm and the second diameter is 1 mm. Typically a plastic-optical fiber has a diameter of 1 mm.

The first end 176 of the plastic-optical fiber 175 is fused to the small end 180 of the beam expander 178 and the fused-fractional end 310 of the 1:N-split fiber 350 is fused to the large end 179 of the beam expander 178. In this manner, the first end 176 of the plastic-optical fiber 175 is optically coupled to the fused-fractional end 310 of the 1:N-split fiber 350 via the beam expander 178. In one implementation of this embodiment, the small end 180 of the beam expander is ultrasonically welded to the plastic-optical fiber 175 with the smaller diameter (e.g., a diameter of 1 mm).

Figure 11:
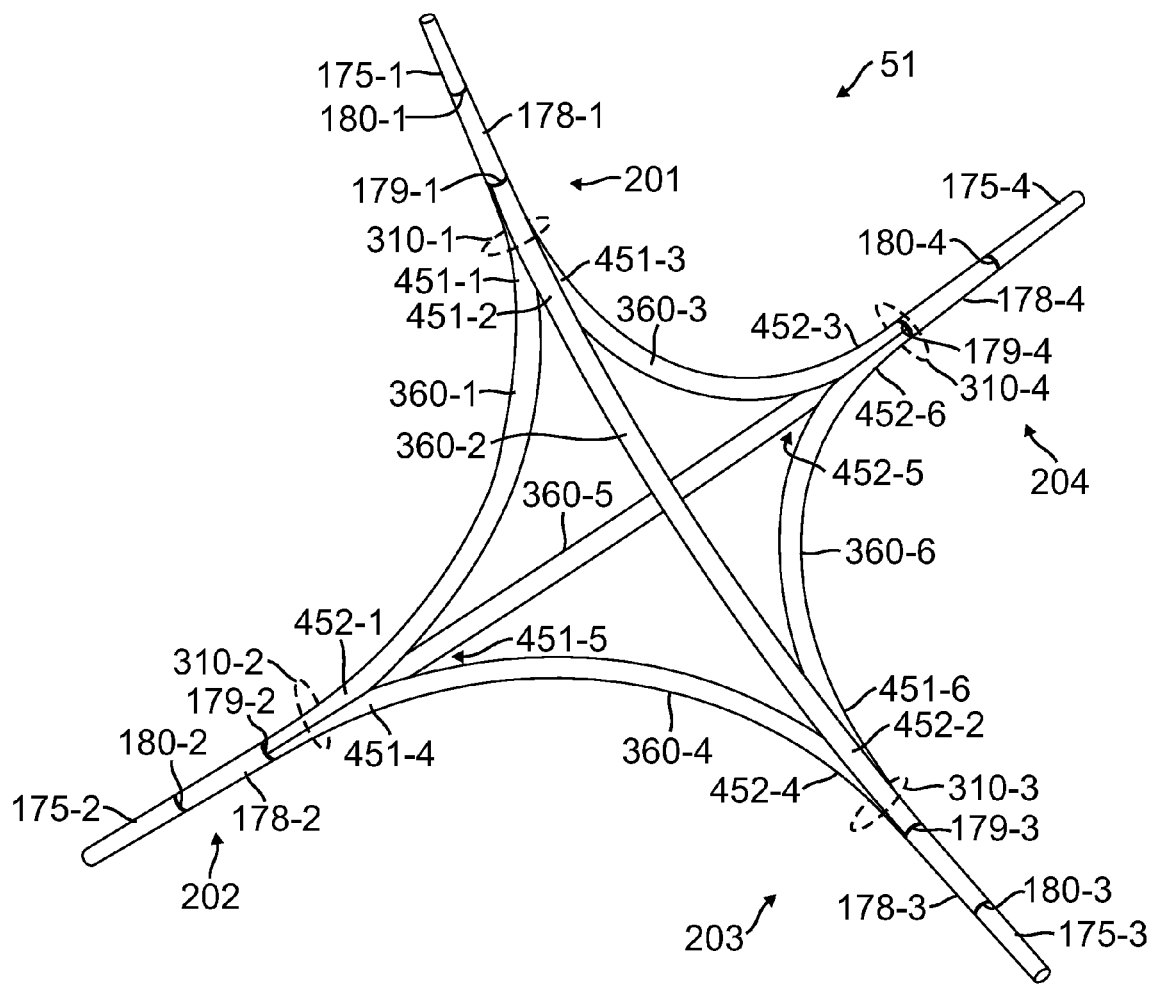
FIG. 11 illustrates an embodiment of a low loss passive optical hub including the beam expander of FIG. 9 in accordance with the present invention.

FIG. 11 illustrates an embodiment of a low loss passive optical hub 51 including the beam expander 178 of FIG. 9 in accordance with the present invention. The POH 51 differs from the POH 50 of FIG. 8 in that a first beam expander 178-1 is in the first node 201, a second beam expander 178-2 is in the second node 203, a third beam expander 178-3 is in the third node 203, and a fourth beam expander 178-4 is in the fourth node 201. The large ends 179 of the beam expanders 178(1-4) are each fused to the respective fused-fractional ends 310(1-4) and the small ends 180 of the of the beam expanders 178(1-4) are each fused to the respective plastic-optical fibers 175(1-3). In this embodiment, the diameter of the fused-fractional ends 310(1-4) is equal to the diameter of the large ends 179 of the respective beam expanders 178(1-4).

A plurality of the embodiments of the POHs described herein can be implemented in a low cost, low loss optical fiber bus network. Such an optical fiber bus network would include the low cost plastic optical fibers to link the POH 50 (FIG. 8) and/or the POH 51 (FIG. 11) to each other as required by the application. This type of optical fiber bus network would weigh less than a copper bus network and would, therefore be useful on an aircraft since it is desirable to reduce the weight on aircraft.

EXAMPLE EMBODIMENTS

Example 1 includes a node for a low loss passive optical hub, comprising: a 1:N-split fiber having a fused-fractional end and N second-fractional ends, the 1:N-split fiber formed from N sub-fibers, the N sub-fibers each having a first-fractional end and a second-fractional end, wherein the N first-fractional ends are fused to form the fused-fractional end; and a plastic-optical fiber having a first end and a second end, the first end of the plastic-optical fiber optically coupled to the fused-fractional end of the 1:N-split fiber.

Example 2 includes the node of Example 1, wherein N equals 3, wherein the 1:N-split fiber is a 1:3-split fiber formed from three sub-fibers, and wherein three first-fractional ends are fused to form the fused-fractional end.

Example 3 includes the node of any of Examples 1-2, wherein at least one of the N sub-fibers includes a non-fractional segment.

Example 4 includes the node of any of Examples 1-3, further comprising: a beam expander having a large end and a small end, the large end having a larger diameter than the small end, wherein the first end of the plastic-optical fiber is fused to the small end, and wherein the fused-fractional end of the 1:N-split fiber is fused to the large end so the first end of the plastic-optical fiber is optically coupled to the fused-fractional end of the 1:N-split fiber via the beam expander.

Example 5 includes the node of any of Examples 1-3, wherein the first end of the plastic-optical fiber is fused to the fused-fractional end of the 1:N-split fiber.

Example 6 includes an (N+1)-way passive optical hub, comprising: (N+1) plastic-optical fibers each having a first end and a second end; and $N+(N-1)+(N-2)+\ldots+[N-(N-1)]$ sub-fibers having respective $N+(N-1)+(N-2)+\ldots+[N-(N-1)]$ first-fractional ends and $N+(N-1)+(N-2)+\ldots+[N-(N-1)]$ second-fractional ends, wherein N first-fractional ends of N of the $N+(N-1)+(N-2)+\ldots+[N-(N-1)]$ sub-fibers are fused together to form a fused-fractional end of a 1:N-split fiber, wherein the fused-fractional end is fused to one of a first end of a first plastic-optical fiber or a large end of a first beam expander to form a first node, wherein a second-fractional end of a first-sub-fiber of the N sub-fibers is fused to one of a first end of a second plastic-optical fiber or a large end of a second beam expander, and wherein a second-fractional end of an $N^{th}$-sub-fiber of the N sub-fibers is fused to a first end of an $(N+1)^{th}$ plastic-optical fiber or a large end of an $(N+1)^{th}$ beam expander.

Example 7 includes the (N+1)-way passive optical hub of Example 6, wherein the fused-fractional end is fused to the large end of the first beam expander, wherein the first end of the first plastic-optical fiber is fused to a small end of the first beam expander, wherein the second-fractional end of the first-sub-fiber of the N sub-fibers is fused to the large end of the second beam expander, wherein the first end of the second plastic-optical fiber is fused to a small end of the second beam expander, wherein the second-fractional end of the $N^{th}$-sub-fiber of the N sub-fibers is fused to the large end of the $(N+1)^{th}$ beam expander, and wherein the first end of the $(N+1)^{th}$ plastic-optical fiber is fused to a small end of the $(N+1)^{th}$ beam expander.

Example 8 includes the (N+1)-way passive optical hub of any of Examples 6-7, wherein N equals 3, wherein the (N+1)-way passive optical hub is a 4-way passive optical hub comprising: four plastic-optical fibers each having the first end and the second end; and six sub-fibers having respective six first-fractional ends and six second-fractional ends, wherein three first-fractional ends of three of the six sub-fibers are fused together to form the fused-fractional end that is fused the first end of the first plastic-optical fiber to form the first node, wherein the second-fractional end of the first-sub-fiber of the three of the six sub-fibers is fused to the first end of the second plastic-optical fiber, wherein the second-fractional end of a second-sub-fiber of the three of the six sub-fibers is fused to the first end of a third plastic-optical fiber, and wherein the second-fractional end of a third-sub-fiber of the three of the six sub-fibers is fused to the first end of a fourth plastic-optical fiber.

Example 9 includes the (N+1)-way passive optical hub of Example 8, wherein the first-fractional end of a fourth-sub-fiber of the six sub-fibers is fused to the first end of the second plastic-optical fiber, and wherein the second-fractional end of the fourth-sub-fiber of the six sub-fibers is fused to the first end of the third plastic-optical fiber.

Example 10 includes the (N+1)-way passive optical hub of Example 9, wherein the first-fractional end of a fifth-sub-fiber of the six sub-fibers is fused to the first end of the second plastic-optical fiber, and wherein the second-fractional end of the fifth-sub-fiber of the six sub-fibers is fused to the first end of the fourth plastic-optical fiber.

Example 11 includes the (N+1)-way passive optical hub of Example 10, wherein the first-fractional end of a sixth-sub-fiber of the six sub-fibers is fused to the first end of the third plastic-optical fiber, and wherein the second-fractional end of the sixth-sub-fiber of the six sub-fibers is fused to the first end of the fourth plastic-optical fiber.

Example 12 includes the (N+1)-way passive optical hub of any of Examples 6-7, wherein N equals 3, wherein the (N+1)-way passive optical hub is a 4-way passive optical hub comprising: four plastic-optical fibers each having the first end and the second end; four beam expanders each having a small end and the large end; and six sub-fibers having, respectively, six first-fractional ends and six second-fractional ends, wherein three first-fractional ends of three of the six sub-fibers are fused together to form the fused-fractional end that is fused to the large end of the first beam expander to form the first node, wherein the second-fractional end of the first-sub-fiber of the three of the six sub-fibers is fused to the large end of the second beam expander, wherein the second-fractional end of a second-sub-fiber of the three of the six sub-fibers is fused to the large end of a third beam expander, and wherein the second-fractional end of a third-sub-fiber of the three of the six sub-fibers is fused to the large end of a fourth beam expander.

Example 13 includes the (N+1)-way passive optical hub of Example 12, wherein the first-fractional end of a fourth-sub-fiber of the six sub-fibers is fused to the large end of the second beam expander, wherein the second-fractional end of the fourth-sub-fiber of the six sub-fibers is fused to the large end of the third beam expander, wherein the first-fractional end of a fifth-sub-fiber of the six sub-fibers is fused to the large end of the second beam expander, wherein the second-fractional end of the fifth-sub-fiber of the six sub-fibers is fused to the large end of the fourth beam expander, wherein the first-fractional end of a sixth-sub-fiber of the six sub-fibers is fused to the large end of the third beam expander, and wherein the second-fractional end of the sixth-sub-fiber of the six sub-fibers is fused to the large end of the fourth beam expander.

Example 14 includes the (N+1)-way passive optical hub of any of Examples 12-13, wherein the first end of the first plastic-optical fiber is fused to the small end of the first beam expander, wherein the first end of the second plastic-optical fiber is fused to the small end of the second beam expander, wherein the first end of the third plastic-optical fiber is fused to the small end of the third beam expander, and wherein the first end of the fourth plastic-optical fiber is fused to the small end of the fourth beam expander.

Example 15 includes a method of forming an (N+1)-way passive optical hub for use in a plastic optical fiber network, the method comprising: fusing N first-fractional ends of N of $N+(N-1)+(N-2)+\ldots+[N-(N-1)]$ sub-fibers to form a fused-fractional end; fusing the fused-fractional end to one of a first end of a first plastic-optical fiber or a large end of a first beam expander; fusing a second-fractional end of a first-sub-fiber of the N sub-fibers to one of a first end of a second plastic-optical fiber or a large end of a second beam expander; fusing a second-fractional end of an $N^{th}$-sub-fiber of the N sub-fibers to a first end of an $(N+1)^{th}$ plastic-optical fiber or a large end of an $(N+1)^{th}$ beam expander.

Example 16 includes the method of Example 15, wherein fusing the fused-fractional end to one of the first end of the first plastic-optical fiber or the large end of the first beam expander comprises fusing the fused-fractional end to the large end of the first beam expander, wherein fusing the second-fractional end of the first-sub-fiber of the N sub-fibers to one of the first end of the second plastic-optical fiber or the large end of the second beam expander comprises fusing the second-fractional end of the first-sub-fiber of the N sub-fibers to the large end of the second beam expander, and wherein fusing the second-fractional end of the $N^{th}$-sub-fiber of the N sub-fibers to the first end of the $(N+1)^{th}$ plastic-optical fiber or the large end of the $(N+1)^{th}$ beam expander comprises fusing the second-fractional end of the $N^{th}$-sub-fiber of the N sub-fibers to the large end of the $(N+1)^{th}$ beam expander, the method further comprising: fusing the first end of the first plastic-optical fiber to a small end of the first beam expander; fusing the first end of the second plastic-optical fiber to a small end of the second beam expander; and fusing the first end of the $(N+1)^{th}$ plastic-optical fiber to a small end of the $(N+1)^{th}$ beam expander.

Example 17 includes the method of any of Examples 15-16, wherein N equals 3 and the (N+1)-way passive optical hub is a 4-way passive optical hub including: four plastic-optical fibers having a first end and a second end; and six sub-fibers having, respectively, six first-fractional ends and six second-fractional ends, wherein fusing the N first-fractional ends of the N of $N+(N-1)+(N-2)+\ldots+[N-(N-1)]$ sub-fibers to form the fused-fractional end comprises fusing three first-fractional ends of six sub-fibers to form the fused-fractional end, wherein fusing the fused-fractional end to one of the first end of the first plastic-optical fiber or the large end of the first beam expander comprises fusing the fused-fractional end to the first end of the first plastic-optical fiber, wherein fusing the second-fractional end of the first-sub-fiber of the N sub-fibers to one of the first end of the second plastic-optical fiber or the large end of the second beam expander comprises fusing the second-fractional end of the first-sub-fiber of the three of the six sub-fibers to the first end of the second plastic-optical fiber, and wherein fusing the second-fractional end of the $N^{th}$-sub-fiber of the N sub-fibers to one of the first end of the $(N+1)^{th}$ plastic-optical fiber or the large end of the $(N+1)^{th}$ beam expander comprises fusing the second-fractional end of a third-sub-fiber of the three of the six sub-fibers to the first end of a fourth plastic-optical fiber, the method further comprising: fusing the second-fractional end of a second-sub-fiber of the three of the six sub-fibers to the first end of a third plastic-optical fiber; fusing the first-fractional end of a fourth-sub-fiber of the six sub-fibers to the first end of the second plastic-optical fiber; fusing the second-fractional end of the fourth-sub-fiber of the six sub-fibers to the first end of the third plastic-optical fiber; fusing the first-fractional end of a fifth-sub-fiber of the six sub-fibers to the first end of the second plastic-optical fiber; fusing the second-fractional end of the fifth-sub-fiber of the six sub-fibers to the first end of the fourth plastic-optical fiber; fusing the first-fractional end of a sixth-sub-fiber of the six sub-fibers to the first end of the third plastic-optical fiber; and fusing the second-fractional end of the sixth-sub-fiber of the six sub-fibers to the first end of the fourth plastic-optical fiber.

Example 18 includes the method of any of Examples 15-16, wherein N equals 3 and the (N+1)-way passive optical hub is a 4-way passive optical hub including: four plastic-optical fibers each having the first end and the second end; four beam expanders each having a large end and a small end; and six sub-fibers having, respectively, six first-fractional ends and six second-fractional ends, wherein fusing the N first-fractional ends of the N of N+(N−1)+(N−2)+ . . . +[N−(N−1)] sub-fibers to form the fused-fractional end comprises fusing three first-fractional ends of six sub-fibers to form the fused-fractional end, wherein fusing the fused-fractional end to one of the first end of the first plastic-optical fiber or the large end of the first beam expander comprises fusing the fused-fractional end to the large end of the first beam expander, wherein fusing the second-fractional end of the first-sub-fiber of the N sub-fibers to one of the first end of the second plastic-optical fiber or the large end of the second beam expander comprises fusing the second-fractional end of the first-sub-fiber of the three of the six sub-fibers to the large end of the second beam expander, and wherein fusing the second-fractional end of the $N^{th}$-sub-fiber of the N sub-fibers to one of the first end of the $(N+1)^{th}$ plastic-optical fiber or the large end of the $(N+1)^{th}$ beam expander comprises fusing the second-fractional end of a third-sub-fiber of the three of the six sub-fibers to the large end of a fourth beam expander, the method further comprising: fusing the second-fractional end of a second-sub-fiber of the three of the six sub-fibers to a large end of a third beam expander; fusing the first-fractional end of a fourth-sub-fiber of the six sub-fibers to the large end of the second beam expander; fusing the second-fractional end of the fourth-sub-fiber of the six sub-fibers to the large end of the third beam expander; fusing the first-fractional end of a fifth-sub-fiber of the six sub-fibers to the large end of the second beam expander: fusing the second-fractional end of the fifth-sub-fiber of the six sub-fibers to the large end of the fourth beam expander; fusing the first-fractional end of a sixth-sub-fiber of the six sub-fibers to the large end of the third beam expander; and fusing the second-fractional end of the sixth-sub-fiber of the six sub-fibers to the large end of the fourth beam expander.

Example 19 includes the method of any of Examples 15-18, further comprising: shaving at least a first portion of N+(N−1)+(N−2)+ . . . +[N−(N−1)] plastic-optical fibers to form the N+(N−1)+(N−2)+ . . . +[N−(N−1)] sub-fibers shaving at least a second portion of N+(N−1)+(N−2)+ . . . +[N−(N−1)] plastic-optical fibers to form the N+(N−1)+(N−2)+ . . . +[N−(N−1)] sub-fibers.

Example 20 includes the method of Example 19, further comprising: cutting midsections of the N+(N−1)+(N−2)+ . . . +[N−(N−1)] first portions; and cutting midsections of the N+(N−1)+(N−2)+ . . . +[N−(N−1)] second portions. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A node for a low loss passive optical hub, comprising:
a 1:N-split fiber having a fused-fractional end and N second-fractional ends, the 1:N-split fiber formed from N sub-fibers formed from plastic-optical fibers, the N sub-fibers each having a first-fractional end and a second-fractional end, wherein the first-fractional ends and second-fractional ends have respective V-shaped cross-sectional shapes subtending a desired angle, and wherein the N first-fractional ends are fused to form the fused-fractional end; and
a plastic-optical fiber having a first end and a second end, the first end of the plastic-optical fiber optically coupled to the fused-fractional end of the 1:N-split fiber.

2. The node of claim 1, wherein N equals 3, wherein the 1:N-split fiber is a 1:3-split fiber formed from three sub-fibers, and wherein three first-fractional ends are fused to form the fused-fractional end.

3. The node of claim 1, wherein at least one of the N sub-fibers includes a non-fractional segment.

4. The node of claim 1, further comprising:
a beam expander having a large end and a small end, the large end having a larger diameter than the small end, wherein the first end of the plastic-optical fiber is fused to the small end, and wherein the fused-fractional end of the 1:N-split fiber is fused to the large end so the first end of the plastic-optical fiber is optically coupled to the fused-fractional end of the 1:N-split fiber via the beam expander.

5. The node of claim 1, wherein the first end of the plastic-optical fiber is fused to the fused-fractional end of the 1:N-split fiber.

6. An (N+1)-way passive optical hub, comprising:
(N+1) plastic-optical fibers each having a first end and a second end; and
N+(N−1)+(N−2)+ . . . +[N−(N−1)] sub-fibers formed from plastic-optical fibers and having respective N+(N−1)+(N−2)+ . . . +[N−(N−1)] first-fractional ends and N+(N−1)+(N−2)+ . . . +[N−(N−1)] second-fractional ends, wherein the first-fractional ends and second-fractional ends have respective V-shaped cross-sectional shapes subtending respective desired angles,
wherein N first-fractional ends of N of the N+(N−1)+(N−2)+ . . . +[N−(N−1)] sub-fibers are fused together to form a fused-fractional end of a 1:N-split fiber, wherein the fused-fractional end is fused to one of a first end of a first plastic-optical fiber or a large end of a first beam expander to form a first node,
wherein a second-fractional end of a first-sub-fiber of the N sub-fibers is fused to one of a first end of a second plastic-optical fiber or a large end of a second beam expander, and
wherein a second-fractional end of an $N^{th}$-sub-fiber of the N sub-fibers is fused to a first end of an $(N+1)^{th}$ plastic-optical fiber or a large end of an $(N+1)^{th}$ beam expander.

7. The (N+1)-way passive optical hub of claim 6,
wherein the fused-fractional end is fused to the large end of the first beam expander, wherein the first end of the first plastic-optical fiber is fused to a small end of the first beam expander, wherein the second-fractional end of the first-sub-fiber of the N sub-fibers is fused to the large end of the second beam expander, wherein the first end of the second plastic-optical fiber is fused to a small end of the second beam expander, wherein the second-fractional end of the $N^{th}$-sub-fiber of the N sub-fibers is fused to the large end of the $(N+1)^{th}$ beam expander, and wherein the first end of the $(N+1)^{th}$ plastic-optical fiber is fused to a small end of the $(N+1)^{th}$ beam expander.

8. The (N+1)-way passive optical hub of claim 6, wherein N equals 3, wherein the (N+1)-way passive optical hub is a 4-way passive optical hub comprising:

four plastic-optical fibers each having the first end and the second end; and six sub-fibers having respective six first-fractional ends and six second-fractional ends, wherein three first-fractional ends of three of the six sub-fibers are fused together to form the fused-fractional end that is fused the first end of the first plastic-optical fiber to form the first node, wherein the second-fractional end of the first-sub-fiber of the three of the six sub-fibers is fused to the first end of the second plastic-optical fiber, wherein the second-fractional end of a second-sub-fiber of the three of the six sub-fibers is fused to the first end of a third plastic-optical fiber, and wherein the second-fractional end of a third-sub-fiber of the three of the six sub-fibers is fused to the first end of a fourth plastic-optical fiber.

9. The (N+1)-way passive optical hub of claim 8, wherein the first-fractional end of a fourth-sub-fiber of the six sub-fibers is fused to the first end of the second plastic-optical fiber, and wherein the second-fractional end of the fourth-sub-fiber of the six sub-fibers is fused to the first end of the third plastic-optical fiber.

10. The (N+1)-way passive optical hub of claim 9, wherein the first-fractional end of a fifth-sub-fiber of the six sub-fibers is fused to the first end of the second plastic-optical fiber, and wherein the second-fractional end of the fifth-sub-fiber of the six sub-fibers is fused to the first end of the fourth plastic-optical fiber.

11. The (N+1)-way passive optical hub of claim 10, wherein the first-fractional end of a sixth-sub-fiber of the six sub-fibers is fused to the first end of the third plastic-optical fiber, and wherein the second-fractional end of the sixth-sub-fiber of the six sub-fibers is fused to the first end of the fourth plastic-optical fiber.

12. The (N+1)-way passive optical hub of claim 6, wherein N equals 3, wherein the (N+1)-way passive optical hub is a 4-way passive optical hub comprising:

four plastic-optical fibers each having the first end and the second end;

four beam expanders each having a small end and the large end; and six sub-fibers having, respectively, six first-fractional ends and six second-fractional ends, wherein three first-fractional ends of three of the six sub-fibers are fused together to form the fused-fractional end that is fused to the large end of the first beam expander to form the first node, wherein the second-fractional end of the first-sub-fiber of the three of the six sub-fibers is fused to the large end of the second beam expander, wherein the second-fractional end of a second-sub-fiber of the three of the six sub-fibers is fused to the large end of a third beam expander, and wherein the second-fractional end of a third-sub-fiber of the three of the six sub-fibers is fused to the large end of a fourth beam expander.

13. The (N+1)-way passive optical hub of claim 12, wherein the first-fractional end of a fourth-sub-fiber of the six sub-fibers is fused to the large end of the second beam expander, wherein the second-fractional end of the fourth-sub-fiber of the six sub-fibers is fused to the large end of the third beam expander, wherein the first-fractional end of a fifth-sub-fiber of the six sub-fibers is fused to the large end of the second beam expander, wherein the second-fractional end of the fifth-sub-fiber of the six sub-fibers is fused to the large end of the fourth beam expander, wherein the first-fractional end of a sixth-sub-fiber of the six sub-fibers is fused to the large end of the third beam expander, and wherein the second-fractional end of the sixth-sub-fiber of the six sub-fibers is fused to the large end of the fourth beam expander.

14. The (N+1)-way passive optical hub of claim 12, wherein the first end of the first plastic-optical fiber is fused to the small end of the first beam expander, wherein the first end of the second plastic-optical fiber is fused to the small end of the second beam expander, wherein the first end of the third plastic-optical fiber is fused to the small end of the third beam expander, and wherein the first end of the fourth plastic-optical fiber is fused to the small end of the fourth beam expander.

\* \* \* \* \*